United States Patent
Hilvers et al.

(10) Patent No.: US 9,840,121 B2
(45) Date of Patent: Dec. 12, 2017

(54) SUSPENSION AXLE

(71) Applicant: UNVERFERTH MANUFACTURING COMPANY, INC., Kalida, OH (US)

(72) Inventors: Michael J. Hilvers, Fort Jennings, OH (US); David R. Smith, Fort Jennings, OH (US); Shawn W. Gerdeman, Delpho, OH (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

(21) Appl. No.: 14/886,960

(22) Filed: Oct. 19, 2015

(65) Prior Publication Data

US 2016/0114642 A1    Apr. 28, 2016

Related U.S. Application Data

(60) Provisional application No. 62/067,691, filed on Oct. 23, 2014.

(51) Int. Cl.
*B60G 11/22* (2006.01)
*B60G 3/14* (2006.01)

(52) U.S. Cl.
CPC ............ *B60G 11/225* (2013.01); *B60G 3/145* (2013.01); *B60G 2202/142* (2013.01); *B60G 2300/04* (2013.01)

(58) Field of Classification Search
CPC .. B60G 11/225; B60G 3/145; B60G 2300/04; B60G 2202/142
See application file for complete search history.

(56) References Cited

U.S. PATENT DOCUMENTS

| | | | | |
|---|---|---|---|---|
| 2,917,304 A | * | 12/1959 | Nilsson | B60G 11/225 267/189 |
| 3,284,095 A | * | 11/1966 | Allison | B60G 11/44 267/273 |
| 3,294,415 A | * | 12/1966 | Allison | B60G 9/00 267/27 |
| 3,333,864 A | * | 8/1967 | Allison | B60G 7/02 267/67 |
| 3,386,751 A | * | 6/1968 | Allison | B60G 11/181 267/273 |
| 3,520,553 A | * | 7/1970 | Allison | B60G 9/00 267/248 |

(Continued)

OTHER PUBLICATIONS

Silent Ride Suspension, Typical Single Axle installation, Timbren Industries, Inc. brochure, 2 pgs.

(Continued)

*Primary Examiner* — Darlene P Condra
(74) *Attorney, Agent, or Firm* — Rothwell, Figg, Ernst & Manbeck, P.C.

(57) ABSTRACT

A suspension axle for a farm equipment is provided. The suspension axle includes an axle beam having two ends. The two ends are configured to be simply supported to the farm equipment. The suspension axle also includes a first mounting arm coupled to the axle beam between the two ends and extending outwardly from the axle beam. The suspension axle also includes a first mounting bracket pivotably coupled to the first mounting arm at a first horizontal pivot axis. The suspension axle also includes a first suspension member coupled to at least one of the axle beam and the first mounting arm.

22 Claims, 5 Drawing Sheets

(56) References Cited

U.S. PATENT DOCUMENTS

| | | | | |
|---|---|---|---|---|
| 2004/0183271 | A1* | 9/2004 | Galazin | B60G 9/003 280/124.128 |
| 2006/0181047 | A1* | 8/2006 | Chamberlin | B60G 7/001 280/124.128 |
| 2006/0220337 | A1* | 10/2006 | Galazin | B21D 53/88 280/124.116 |
| 2008/0252031 | A1* | 10/2008 | Dudding | B60G 7/001 280/124.116 |
| 2009/0278329 | A1* | 11/2009 | VanDenberg | B60G 11/225 280/124.13 |
| 2010/0207346 | A1* | 8/2010 | VanDenberg | B60G 11/225 280/124.128 |
| 2011/0163514 | A1* | 7/2011 | Saieg | B60G 9/003 280/124.116 |
| 2012/0217714 | A1* | 8/2012 | Kiselis | B60G 7/001 280/124.116 |
| 2012/0285754 | A1* | 11/2012 | Husson | B60G 9/02 180/60 |
| 2014/0035247 | A1* | 2/2014 | Wells | B62D 7/18 280/93.512 |
| 2016/0129745 | A1* | 5/2016 | Son | B60G 11/27 280/86.5 |

OTHER PUBLICATIONS

Reliable, Rubber Torsion Axles, Reliable Tool & Machine Co., Inc. brochure, 20 pgs.
Dexter Axle, Torflex Axles for Agricultural Equipment brochure, 2 pgs.
6, 100-7,000 lb. Torsion Axles, Axis Products Inc, brochure, 4 pgs.
4,000-6,000 lb. Torsion Axles, Axis Products, Inc. brochure, 4 pgs.

* cited by examiner

SUSPENSION AXLE

CROSS-REFERENCE TO RELATED APPLICATIONS

This application claims priority to U.S. Provisional Application No. 62/067,691, entitled "Suspension Axle," filed on Oct. 23, 2014, the disclosure of which is incorporated here in its entirety.

BACKGROUND OF THE INVENTION

Field of the Invention

The present invention relates generally to the field of balancing loads on a suspension axle and specifically to a suspension axle for farm equipment.

Description of the Background Art

In various industry types (e.g., agricultural, transportation, manufacturing, etc.), various types of equipment can use a suspension axle to carry one or more loads (e.g., a vehicle load). One example of a suspension axle is a cantilevered rubber torsion axle 100 that is a square shaft captured inside a square tube, such as illustrated in FIG. 1. This is a common suspension axle used for farm equipment such as for a combine head trailer or seed tender. In this design, an inner 108 bar is indexed at 45 degrees with respect to an outer tube 106 and rubber chords 110 are inserted in the space between the inner bar 108 and the outer tube 106. As the inner bar 108 rotates, it compresses the rubber chords 110 which results in the suspension. Suspension arm 102 is cantilevered and is coupled to mounting bracket 104. The inner bar 108 has a front to rear arm 102 that contains the inner bar 108 at one end and a tire/hub/spindle on the opposing end, thus creating a cantilevered arm 102 on the inner bar 108.

Such existing suspension axles have a number of inadequacies, based on the configuration of the suspension axle and the spindle or suspension arms being cantilevered. For example, camber and toe varies through the stroke of the suspension arm as the suspension arm goes from unloaded to loaded to full deflection. This is in part because of the cantilevered design allowing the front to rear member to twist in the inner bar that is mounted on rubber. The only thing that keeps the inner bar and the mounting tube components together is friction. Thus, a suspension failure may result in the spindle/suspension arm separating from the mounting. That is, if the suspension member fails the axle itself will fail. Also, as the suspension member is usually made out of rubber, the rubber component can get brittle and wear out over time. If this occurs, then the entire axle must be replaced as there are no serviceable components. Mounting members are typically welded to the axle beam in this design, and so cannot be interchanged or adapted to different installation requirements. Furthermore, the suspension rate or the frame height cannot be adjusted and the members that mount an axle to the frame are also not interchangeable.

Other existing suspension axles for farm equipment also rely on cantilevered members and share many of the disadvantages of the cantilevered rubber torsion axle 100.

Thus, a suspension axle design is needed to overcome the shortcomings of currently available products.

SUMMARY OF THE INVENTION

According to a first aspect of the present invention, a suspension axle for a farm equipment is provided. The suspension axle includes an axle beam having two ends. The two ends are configured to be simply supported to the farm equipment. The suspension axle also includes a first mounting arm coupled to the axle beam between the two ends and extending outwardly from the axle beam. The suspension axle also includes a first mounting bracket pivotably coupled to the first mounting arm at a first horizontal pivot axis. The suspension axle also includes a first suspension member coupled to at least one of the axle beam and the first mounting arm.

In some embodiments, the suspension axle further includes a second mounting arm coupled to the axle beam between the two ends and extending outwardly from the axle beam. The suspension axle may also further include a second mounting bracket pivotably coupled to the second mounting arm at a second horizontal pivot axis. The suspension axle may also further include a second suspension member coupled to at least one of the axle beam and the second mounting arm.

In some embodiments, at least one of the first suspension member and the second suspension member is interchangeable. In some embodiments, at least one of the first suspension member and the second suspension member is attached by means of a single nut and bolt. In some embodiments, at least one of the first suspension member and the second suspension member comprises rubber and, in some embodiments, comprises a rubber spring. In some embodiments, at least one of the first mounting bracket and the second mounting bracket is interchangeable.

In some embodiments, the first mounting bracket includes a first mounting hole and a first bushing enclosed in the mounting hole and encapsulated in rubber. In some embodiments the first mounting bracket is coupled to the first mounting arm by a first bolt that passes through the first mounting arm and the first mounting hole and the first bushing. In some embodiments, the second mounting bracket includes a second mounting hole and a second bushing enclosed in the mounting hole and encapsulated in rubber. In some embodiments, the second mounting bracket is coupled to the second mounting arm by a second bolt that passes through the second mounting arm and the second mounting hole and the second bushing. In some embodiments, at least one of the first bushing and the second bushing is a metal bushing.

In some embodiments, at least one of the first mounting bracket and the second mounting bracket is symmetrical. In some embodiments, at least one of the first mounting bracket and the second mounting bracket is configured to provide dampening in three orthogonal directions and to provide rotational dampening. In some embodiments, at least one of the first mounting bracket and the second mounting bracket is a non-lubricated mounting bracket. In some embodiments, at least one of the first mounting bracket and the second mounting bracket includes a grease Zerk fitting.

In some embodiments, the axle beam is rigid. In some embodiments, each of the two ends includes a spindle and the axle does not include any cantilevered suspension or vertical-load-carrying member. In some embodiments, the two ends are configured to support purely vertical loads. In some embodiments, the suspension axle is configured to stay substantially intact following a failure of at least one of the first suspension member and the second suspension member.

DETAILED DESCRIPTION

Apparatus, systems, and methods described herein provide for a suspension axle that includes interchangeable components that provide for a variety of improvements. Specifically, embodiments of the present invention allow for: (i) a rigid axle with no cantilevered suspension or vertical-load-carrying parts allowing for keeping the spindles and/or hubs on the centerline of the axle, instead of cantilevered to the rear and also providing for improved maintenance of camber and toe and, thus, improved trailing and/or tire wear; (ii) replaceable suspension components that can be serviceable, replaceable, and/or interchangeable with other components if the suspension components begin to wear out; (iii) adjustable load carrying capacity, based on using interchangeable suspension members, to match a variety of loads and travel heights; (iv) interchangeable mounting brackets that make the axle design adaptable to applications requiring different mounting needs; and/or (v) maintaining axle components intact during travel in the event of a failure of a suspension spring.

As a result, embodiments of the present invention allow for an apparatus that can be changed to accommodate different applications and failures. Furthermore, embodiments of the present invention ensure that none of the suspension or vertical-load-carrying components are cantilevered, thus making everything balance loaded. In some embodiments, the only load that is cantilevered is a spindle itself, located at an end of the axle. Thus, embodiments of the present invention can result in lower maintenance and/or replacements costs to the owner/user of the suspension axle. Additionally, the suspension axle allows for a highly adaptable apparatus that can be used for a variety of different functions that retain the camber and toe-in of spindles/hubs/tires.

As is understood in this art, a beam is a structural element that is capable of withstanding a load primarily by resisting bending. Beams are typically classified based on their support. For example, a fixed beam is supported on both ends and restrained from rotation. A cantilever beam is a projecting beam fixed at one end. A simply supported beam is a beam supported on both ends that is free to rotate. As is known, there are other types of support for beams.

Figure 2:
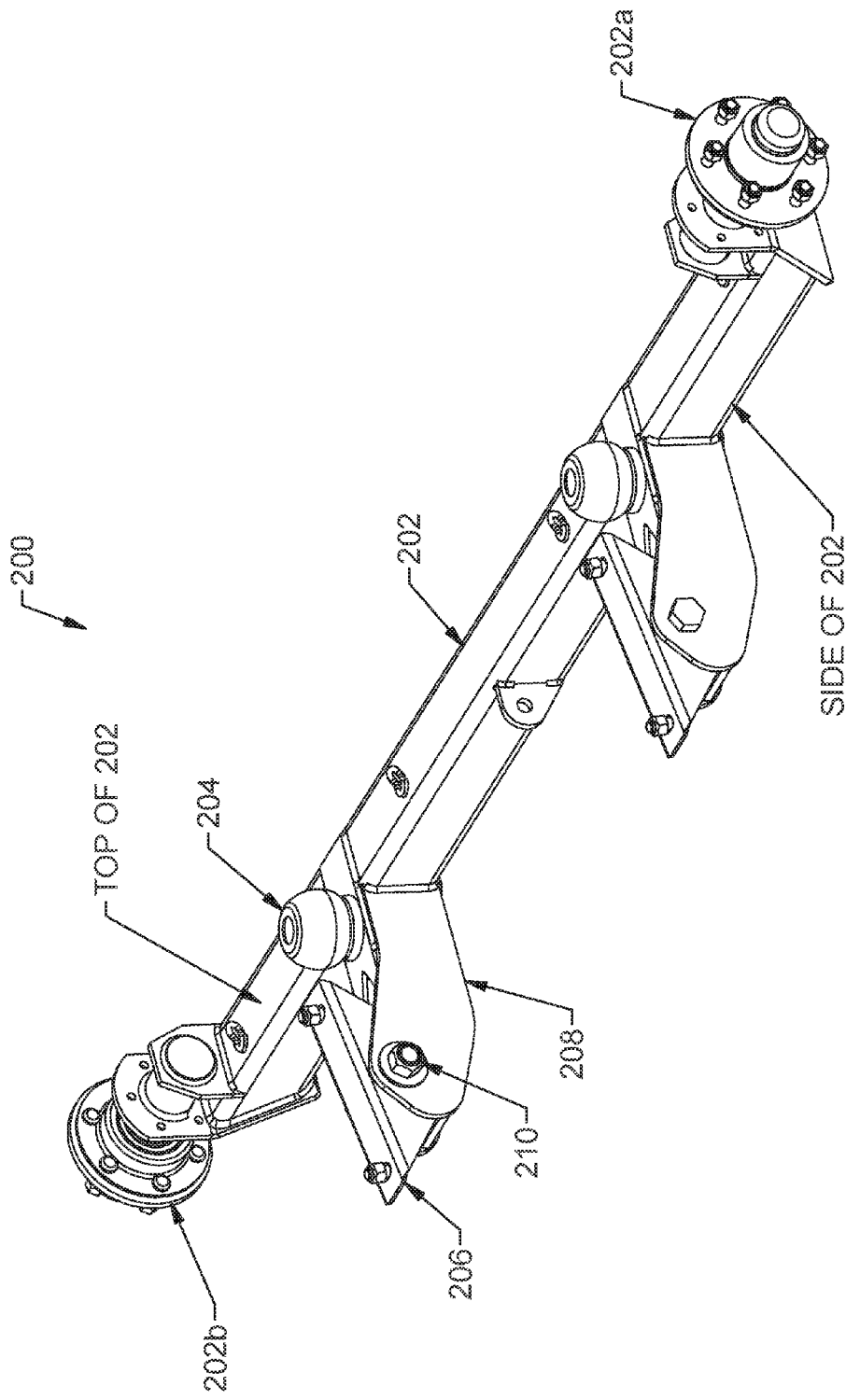
FIG. 2 is an example view of a suspension axle in accordance with aspects of the present invention.

FIG. 2 is an example view of a suspension axle 200 in accordance with aspects of the present invention. As shown in FIG. 2, suspension axle 200 is an apparatus that includes components, such as axle beam 202, spindles 202a and 202b, suspension member 204, mounting bracket 206, mounting arm 208, and pivot 210. While FIG. 2 shows a particular number of components, suspension axle 200 can include greater of fewer quantities of the different types of components. For example, suspension axle 200 can include fewer or greater quantities of suspension members 204 and/or fewer or greater quantities of mounting brackets 206. Although pivot 210 is depicted as a nut and bolt, one of skill in this art will recognize that other pivot designs are possible In some embodiments, one or more of the components of axle 200 are suspension members that are not cantilevered. This results in only balanced loading with only the spindle itself being cantilevered but not the loads on the spindle since those are vertical loads. Suspension axle 202 may be used with farm equipment, such as a combine head trailer or seed tender.

In some embodiments, mounts 208 are cantilevered, and act as a coupling device. In some embodiments, suspension member 204 is on or close to the centerline of the suspension axle and spindles 202a, 202b, thereby making all vertical loading and reactive forces (suspension) be on a common axis.

In some embodiments, axle beam 202 includes two ends, for example one end having spindle 202a and another end having spindle 202b. In some embodiments, the two ends are configured to be simply supported to the farm equipment or other machine that the suspension axle 200 is supporting. In some embodiments, mounting arm 208 extends outwardly from axle beam 202, and may be part of axle beam 202 or a separate member from axle beam 202.

In some embodiments, axle beam 202 is a solid rigid beam that can support a number of loads connected at either of the ends of axle beam 202, connected to the top of axle beam 202, and/or connected to one or more sides of axle beam 202. Axle beam 202 can also be referred to as a rigid beam, rod, bar, etc. In some embodiments, axle beam 202 can be made out of a particular material, such as steel, aluminum, iron, plastic based material, a hybrid material (e.g., a mix of metal, plastic, etc.), and/or any other material. In some embodiments, axle beam 202 can be of a particular shape. For example, a cross-sectional view of axle beam 202 can be circular, square, rectangular, triangular, and/or any other type of shape. In some embodiments, axle beam 202 can be of a particular thickness, length and/or width.

Figure 3:
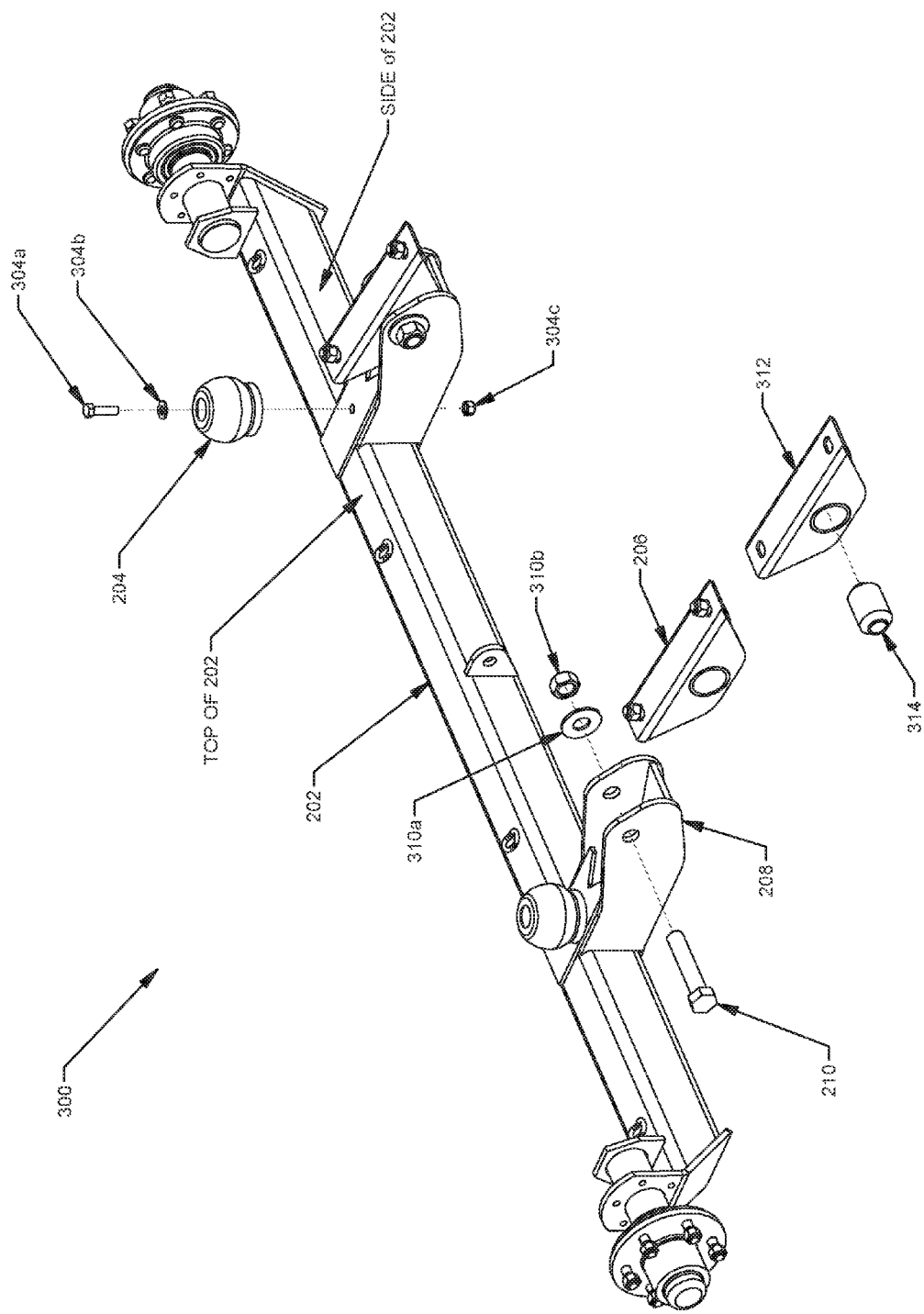
FIG. 3 is an example view of a suspension axle in accordance with aspects of the present invention.

In some embodiments, spindles 202a and 202b are located at the end portions of axle beam 202. While FIG. 2 shows spindles at each end of axle beam 202, in alternate embodiments, only one spindle is located at one end of axle beam 202. In some embodiments, spindles 202a and 202b are themselves cantilevered onto axle beam 202. In some embodiments, loads attached to spindles 202a and 202b are purely vertical loads and are not cantilevered members. In some embodiments, spindles 202a and 202b are configured to be simply supported. While FIG. 2, and also FIG. 3, show spindles at each end of axle beam 202, other types of components can be attached to one or both ends of axle beam 202. For example, the ends of axle beam 202 can include a hub, a tire, and/or any other mechanism that can be used to support loads, e.g., vertical loads.

Figure 1:
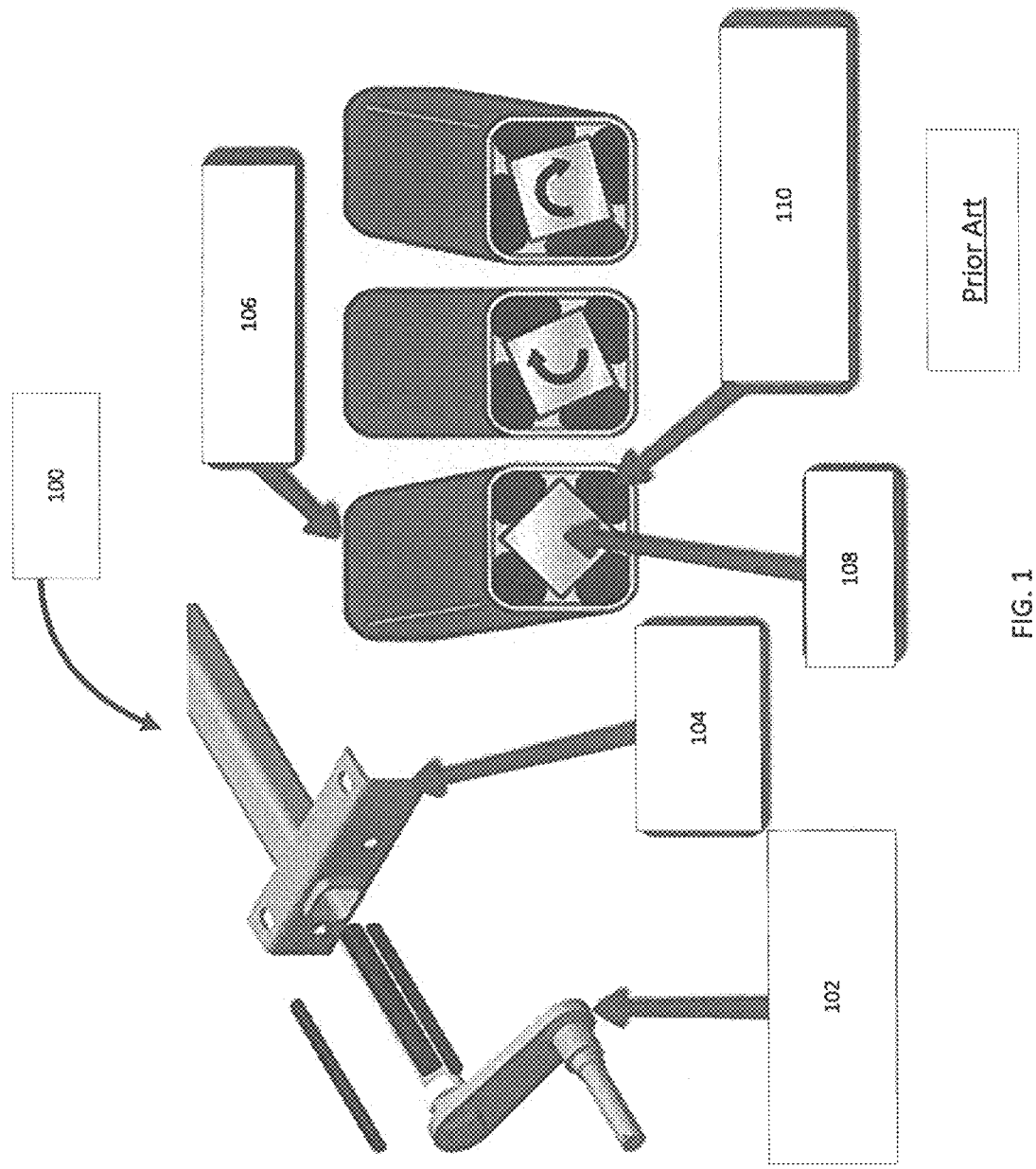
FIG. 1 illustrates a prior art suspension axle.

In some embodiments, suspension member 204 is an interchangeable/serviceable component that allows for other types of apparatus to be positioned on top of axle beam 202. Suspension member 204 may be comprise rubber and may also comprise a spring. Suspension member 204 can be changed/replaced to accommodate different load situations relating to differing heights (e.g., trailer frame heights). Suspension member 204 can also be referred to as a rubber suspension, suspension device, cushion, etc. Also, in some embodiments, if one suspension member 204 fails, the remaining portions of axle beam 102 will remain intact. This allows, for example, for safe travel of the farm equipment being carried by the suspension axle 200 until the suspension axle can be repaired. In the prior art system depicted in FIG. 1, for example, if the suspension fails there is nothing that keeps the inner bar in the outer tube other than friction, so the axle arm/hub/wheel/tire can fall off the axle leaving the farm equipment or other machine being carried by the suspension axle unmovable, and also creating a potential safety problem from flying parts.

In some embodiments, suspension member 204 can be made of a rubber. In some embodiments, suspension member 204 can be made of other materials, such as a metal or a hybrid of metal and rubber. In some embodiments, suspension member 204 can be varied in height (such as by being replaced with another type of suspension member) to accommodate different applications. In some embodiments, suspension member 204 is connected to axle beam 202 via a screw, bolt, and/or pivot, as shown in FIG. 2. In alternate embodiments, suspension spring 204 is connected such that the base of suspension spring 204 is partially connected to the top portion of axle beam 202 and a top portion of arm 208. Furthermore, in some embodiments, suspension member 204 can be replaced in the event that suspension spring 204 becomes damaged or worn out.

Additionally, or alternatively, suspension member 204 can be uniquely designed for different loads and can be replaced depending upon the application and/or type of load for which axle beam 202 is being used. In some embodiments, axle beam 202 can have multiple suspension members 204 that are of the same dimensions and shape. In alternate embodiments, axle beam 202 can have multiple suspension members that are of different dimensions (e.g., height, width, thickness, etc.) and shapes (e.g., spherical, square, etc.).

In some embodiments, mounting bracket 206 can be a mounting bracket that is located to the side of axle beam 202, as shown in FIGS. 2 and 3. Mounting bracket 206 can also be referred to as a bracket, mount, stand, etc. In some embodiments, mounting bracket 206 is connected to axle beam 202 by arm 208 that is an extension of axle beam 202. In some embodiments, the top of mounting bracket 206 can be higher than the top of axle beam 202. In alternate embodiments, the top of mount 206 can be at the same level, plane, as the top of axle beam 202. In further embodiments, the top of mounting bracket 206 can be lower than the top of axle beam 202.

In some embodiments, mounting bracket 206 is adjustable and can be replaced with different mounts for different applications. Thus, the shape of mounting bracket 206 can be replaced with other mounting brackets having different shapes. In some embodiments, mounting bracket 206 is connected to arm 208 via a single pivot, such as pivot 210. In some embodiments, arm 208 and axle beam 202 are fabricated as one piece. In alternate embodiments, arm 208 is attached to axle beam 202, such as by welding arm 208 to axle beam 202 or by mechanically fastening arm 208 to axle beam 202. In some embodiments, the top of mounting bracket 206 includes one or more openings (e.g., two openings are shown in FIGS. 2 and 3) used to attach loads to mounting bracket 206 and which are, thus, loaded onto the top of axle beam 202. An example arm 208 is further described in FIG. 5.

Pivot 210 can also be referred to as a pin, a screw, ball joint, etc. In some embodiments, pivot 210 is a pivot that connects mounting bracket 206 to arm 208 and as a result connects to axle beam 202. In some embodiments, pivot 210 may include a washer and a nut/bolt attachable to pivot 210 so as to tighten or loosen pivot 210. In some embodiments, pivot 210 can be loosened to remove mounting bracket 206 from arm 208 so that mounting bracket 206 can be adjusted or replaced with a different mounting bracket. Thus, a single pivot 210 prevents the need to use multiple components, screws, pins, etc., and/or the need for a frame rail to connect mount 208 to axle beam 202.

In some embodiments, although the trailer frame height being supported by axle beam 200 cannot itself be adjusted, the frame height of different trailers can be accommodated by replacing or altering the suspension members 204, or, for example, by adding one or more shims to suspension members 204. This allows the axle beam 200, for example, to accommodate a variety of load carrying capacity needs and traveling heights. In short, the suspension axle 202 is customizable. This is one advantage over the prior art system described in FIG. 1, for example, since the torsion axle cannot be customized once it is assembled.

FIG. 3 is an example suspension axle 300 in accordance with aspects of the present invention. FIG. 3 shows axle beam 202, suspension member 204, bolt 304a, fastener 304b, nut 304c, mounting bracket 206, mounting arm 208, pivot 210, fastener 310a, nut 310b, mounting bracket 312, and bushing 314. In some embodiments, axle beam 202, suspension member 204, mounting bracket 206, mounting arm 208, and pivot 210 are as described in the description of FIG. 2. Also, while FIG. 2 shows mount 206 and mount 312, only one of the mounts is inserted into a particular mounting arm 208 at one time.

In some embodiments, bolt 304a, fastener 304b, and nut 304c are used together to connect suspension member 204 to axle beam 202. In some embodiments, bolt 304a can be a screw-like device or can be a non-screw-like device. In some embodiments, fastener 310a and nut 310b are used together to connect either mount 206 or mount 312. In some embodiments, pivot 210 can be a screw-like device or can be a non-screw-like device and is inserted into holes/openings designed in mounting arm 208 and the sides of mounting bracket 206 or 312 for attaching mounting bracket 206 or 312 to arm 208.

In some embodiments, mounting bracket 312 can be used instead of mounting bracket 206. In some embodiments, mounting bracket 312 requires no lubrication since bushing 314 can be made of rubber or encapsulated by rubber. Rubber also allows for side-to-side oscillation of the suspension axle. In other embodiments, mounting bracket 206 or 312 may include a grease Zerk fitting. In some embodiments, bushing 314 is inserted into a hole/opening within mounting bracket 312 and then pivot 210 is inserted into the hole/opening of bushing 314. In some embodiments, bushing 314 is cylindrical in shape and has a hole/opening in its center to receive pivot 210. Thus, using fastener 310a and nut 310b with pivot 210, bushing 314 gets clamped between mounting arm 208 and mounting bracket 312 and, as a result, mounting bracket 312 rides on the bushing 314. In some embodiments, bushing 314 is metal and is encapsulated with a rubber material. This results in additional dampening in different directions (e.g. the X, Y, Z directions) as well as torsional/rotational dampening. In some embodiments, bushing 314 is entirely made of rubber or a rubber type material. In some embodiments, mounting bracket 206, 312 is shaped so that the bottom plate of mounting arm 208 serves as a stop so that the axle 202 cannot flip over or be on the opposite side of the pivot 210.

Figure 4:
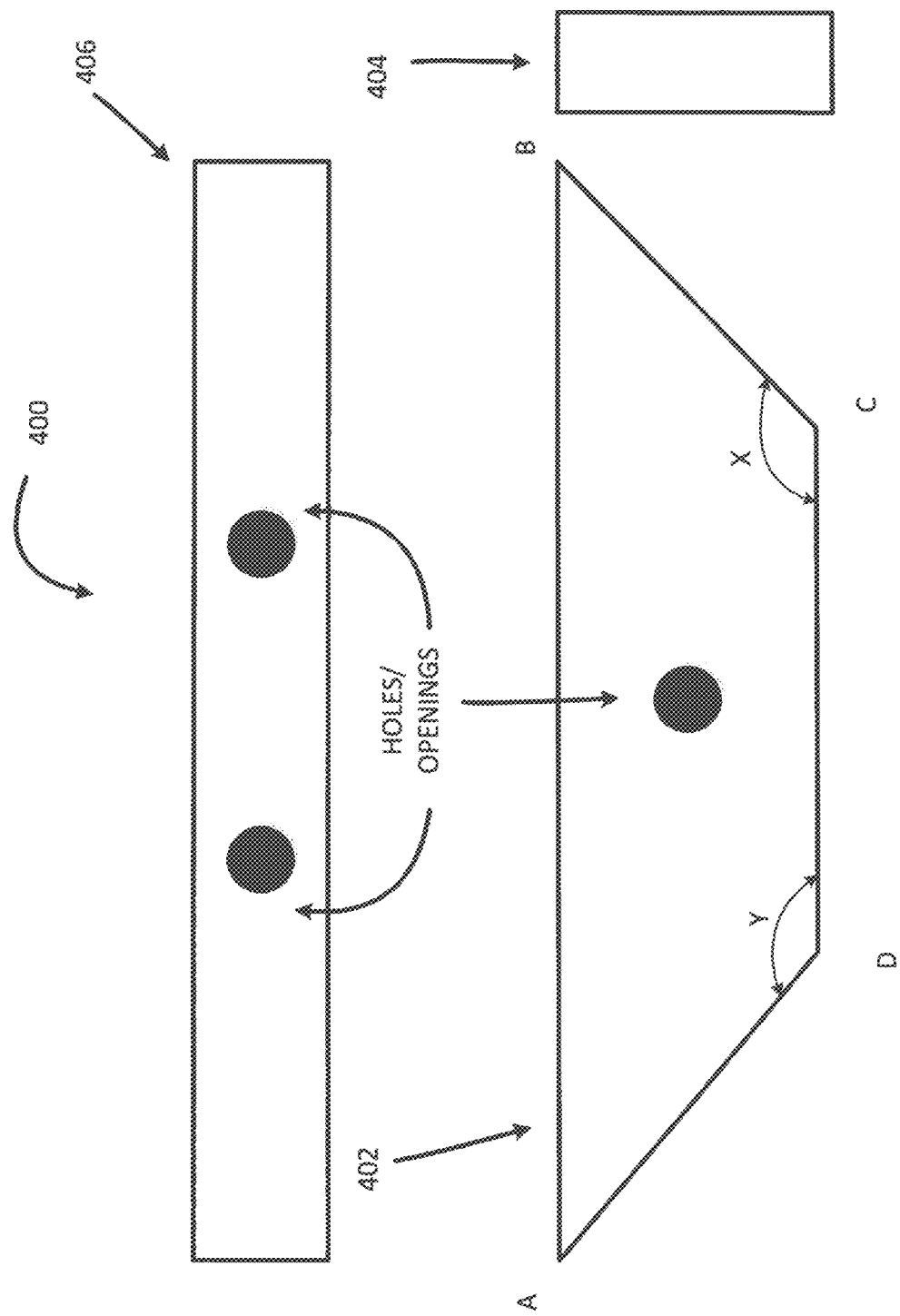
FIG. 4 is an example mount in accordance with aspects of the present invention.

FIG. 4 is an example mounting bracket in accordance with aspects of the present invention. In some embodiments, mounting bracket 400 can be used as mounting bracket 206 or mounting bracket 312 as described in FIGS. 2 and 3. As shown, mounting bracket 400 has a side view 402, end view 404, and a top view 406. In some embodiments, side view 402 is trapezoidal in shape and is shown to have sides AB, BC, CD, and AD, angle X at location C, and angle Y at location D. In some embodiments, side AB is longer than side CD and sides BC and AD are of equal length, as shown in FIG. 4. In alternate embodiments, side BC and AD are of different lengths. In some embodiments, angle X and angle Y can be the same value or, in alternate embodiments, angles X and Y are of different values. While FIG. 3 shows a mounting bracket with a trapezoidal shape, mounting bracket 400 can be of other shapes (e.g., rectangular, triangular, etc.).

In some embodiments, example top view 406 includes two holes/openings which are used to attach a load or different apparatus on top of axle beam 202 by using adjustable screws, pins, or pivots that are inserted into these holes/openings. While top view 406 shows two holes/openings, top view 406 can include greater or fewer openings. In some embodiments, example side view 402 includes one hole/opening which is used to attach mounting bracket 400 (or similarly mounting bracket 206 or 312 described in FIGS. 2 and 3) to a mounting arm, such as mounting arm 208, by inserting pivot 210 into this hole/opening.

Figure 5:
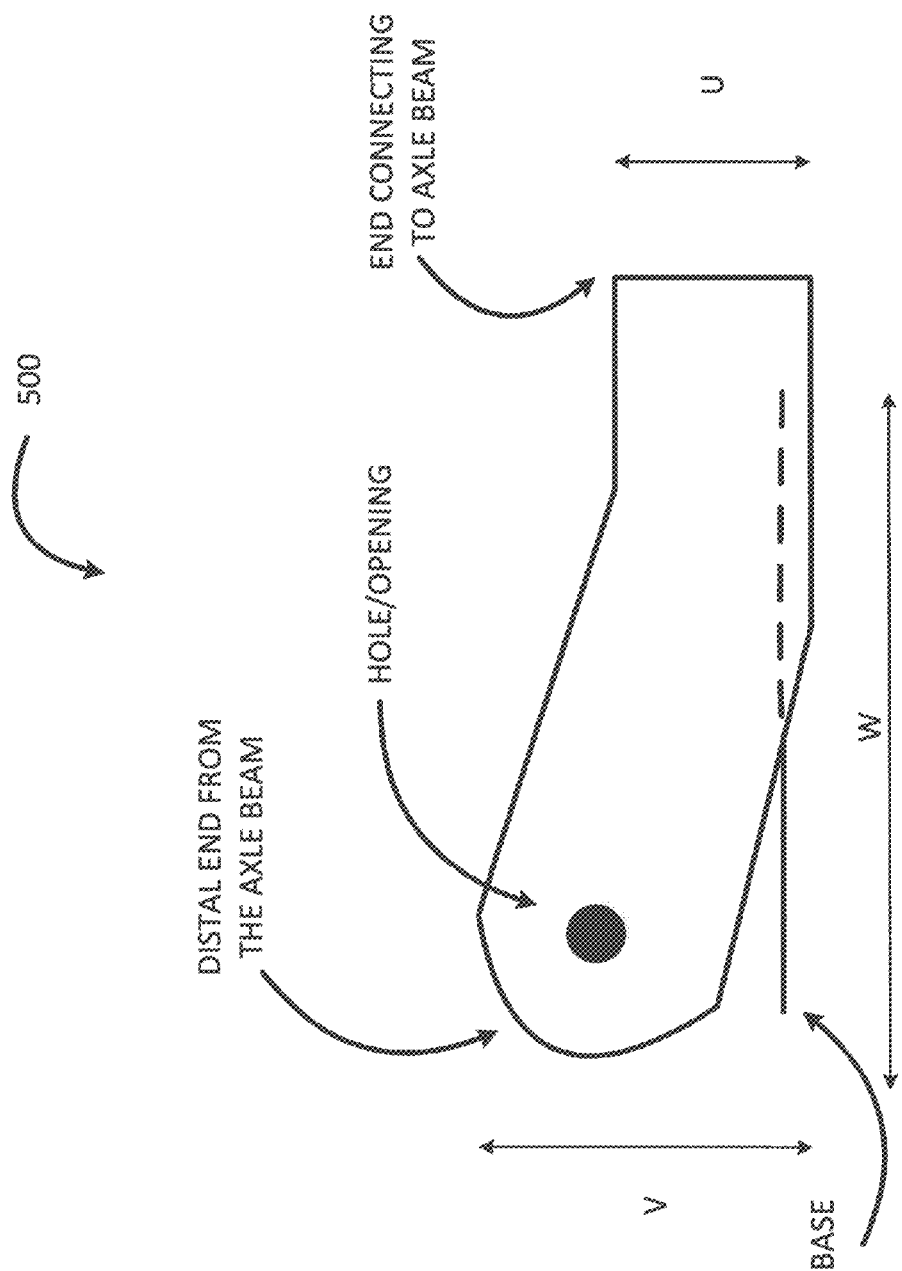
FIG. 5 is an example axle beam arm in accordance with aspects of the present invention.

FIG. 5 is an example axle beam mounting arm 500 in accordance with aspects of the present invention. In some embodiments, axle beam mounting arm 500 can be used as mounting arm 208 as described in FIGS. 2 and 3. As shown in FIG. 5, axle beam mounting arm 500 has a height of value "U," another height of value "V," and a base of length "W." In some embodiments the end of axle beam 500 with the "U" height is located at the end that connects to axle beam 202. Furthermore, the end of mounting arm 500 with the "V" height is located at a distal end from axle beam 202. As shown in FIG. 5, axle beam mounting arm 500 includes an opening through which a pivot, such as pivot 210 described in FIGS. 2 and 3, is used to connect a mounting bracket (e.g., mounting bracket 206 or 312 or 400) to axle beam mounting arm 500. In some embodiments, the hole/opening can be circular or can be of another shape, such as a hexagonal shape, diamond shape, or a square shape. As shown in FIG. 5, the mounting arm 500 extends horizontally from the axle beam 202 for a first portion of arm 500, and then slants upwards at an angle for a second portion of arm 500. As shown, the "U" height value represents the height of the first portion, while the "V" height value represents the difference from the bottom of the first portion to the top of the second, slanted portion. The length "W" represents the length of the arm 500, that is, of both the first and second portions of arm 500. As will be understood, the angle of slant for the second portion may be greater or less than is shown. For example, the angle may be from about 10° to about 80°, are more particularly from about 20° to about 40°, depending on application and design constraints.

In some embodiments, the "V" height is greater than the "U" height. In some embodiments, the "W" base allows for a mounting bracket (e.g., mounting bracket 206 or 312 or 400) to be placed upon it so that the mounting bracket can be connected to an axle beam. Thus, for example, side CD of mounting bracket 400, described in FIG. 4, can slide into the base with the "W" length of which a portion is shown to be within the body of axle beam mounting arm 500. In some embodiments, the distal end of axle beam mounting arm 500 has chamfered edges.

While axle beam mounting arm 500 is shown with a particular shape, mounting arm 500 (and similarly arm 208) can have different shapes. For example, the "U" value can be equal to the "V" value. Alternatively, the "U" value can be greater than the "V" value. In some embodiments, the mounting arm may be straight, or may include a portion that is angled upwards or downwards relative to the axle beam, or the mounting arm may be curved.

Additionally, while the invention has been particularly taught and described with reference to certain embodiments, those versed in the art will appreciate that modifications in form and detail may be made without departing from the spirit and scope of the invention. For example, although mounting brackets 206 are shown as being symmetrical, mounting brackets 206 may alternatively be asymmetrical.

For another example, although axle beam 202 is illustrated as being a single beam, axle beam 202 may also include a plurality of beam sections that are connected together.

These and other modifications of the present invention are intended to be within the scope of the appended claims.

What is claimed is:

1. A suspension axle for a farm equipment, the suspension axle comprising:
   an axle beam having two ends, wherein the two ends are configured to be simply supported to the farm equipment;
   a first mounting arm coupled to the axle beam between the two ends and extending outwardly from the axle beam;
   a first mounting bracket pivotably coupled to the first mounting arm at a first horizontal pivot axis such that the first mounting bracket is pivotable about the first horizontal pivot axis; and
   a first suspension member coupled to at least one of the axle beam and the first mounting arm, wherein the first suspension member is configured to support a load of the farm equipment.

2. The suspension axle of claim 1, further comprising:
   a second mounting arm coupled to the axle beam between the two ends and extending outwardly from the axle beam;
   a second mounting bracket pivotably coupled to the second mounting arm at a second horizontal pivot axis; and
   a second suspension member coupled to at least one of the axle beam and the second mounting arm, wherein the second suspension member is configured to support a load of the farm equipment.

3. The suspension axle of claim 2, wherein at least one of the first suspension member and the second suspension member is removably coupled to at least one of the axle beam and the first mounting arm.

4. The suspension axle of claim 3, wherein at least one of the first suspension member and the second suspension member is attached by means of a single nut and bolt.

5. The suspension axle of claim 2, wherein at least one of the first suspension member and the second suspension member comprises rubber.

6. The suspension axle of claim 2, wherein at least one of the first mounting bracket and the second mounting bracket is removably coupled to the respective first or second mounting arm.

7. The suspension axle of claim 2,
   wherein the first mounting bracket includes a first mounting hole and a first bushing enclosed in the mounting hole and encapsulated in rubber,
   wherein the first mounting bracket is coupled to the first mounting arm by a first bolt that passes through the first mounting arm and the first mounting hole and the first bushing,
   wherein the second mounting bracket includes a second mounting hole and a second bushing enclosed in the mounting hole and encapsulated in rubber, and
   wherein the second mounting bracket is coupled to the second mounting arm by a second bolt that passes through the second mounting arm and the second mounting hole and the second bushing.

8. The suspension axle of claim 7, wherein at least one of the first bushing and the second bushing is a metal bushing.

9. The suspension axle of claim 2, wherein at least one of the first mounting bracket and the second mounting bracket is symmetrical.

10. The suspension axle of claim 2, wherein at least one of the first mounting bracket and the second mounting bracket is configured to provide dampening in three orthogonal directions and to provide rotational dampening.

11. The suspension axle of claim 2, wherein at least one of the first mounting bracket and the second mounting bracket is a non-lubricated mounting bracket.

12. The suspension axle of claim 2, wherein at least one of the first mounting bracket and the second mounting bracket includes a grease Zerk fitting.

13. The suspension axle of claim 1, wherein the axle beam is rigid.

14. The suspension axle of claim 1, wherein each of the two ends includes a spindle and wherein the axle does not include any cantilevered suspension or cantilevered vertical-load-carrying member.

15. The suspension axle of claim 1, wherein the two ends are configured to support purely vertical loads.

16. The suspension axle of claim 1, wherein the suspension axle is configured to stay substantially intact following a failure of at least one of the first suspension member and the second suspension member.

17. The suspension axle of claim 1, wherein the first suspension member comprises a rubber spring.

18. The suspension axle of claim 1, wherein the first suspension member comprises a cushion.

19. The suspension axle of claim 1, further comprising a bushing, wherein the first mounting bracket includes an opening configured to receive the bushing, wherein the bushing is clamped between the first mounting bracket and the first mounting arm, and, as a result, the first mounting bracket is operable to ride on the bushing.

20. The suspension axle of claim 1, wherein the first suspension member is located on a centerline of the axle beam.

21. A suspension axle for a farm equipment, the suspension axle comprising:

an axle beam having two ends, wherein the two ends are configured to be simply supported to the farm equipment;

a first mounting arm coupled to the axle beam between the two ends and extending outwardly from the axle beam;

a first mounting bracket pivotably coupled to the first mounting arm at a first horizontal pivot axis such that the first mounting bracket is pivotable about the first horizontal pivot axis;

a first suspension member coupled to at least one of the axle beam and the first mounting arm;

a second mounting arm coupled to the axle beam between the two ends and extending outwardly from the axle beam;

a second mounting bracket pivotably coupled to the second mounting arm at a second horizontal pivot axis; and a second suspension member coupled to at least one of the axle beam and the second mounting arm, wherein at least one of the first suspension member and the second suspension member comprises a rubber spring.

22. A suspension axle for a farm equipment, the suspension axle comprising:

an axle beam having two ends, wherein the two ends are configured to be simply supported to the farm equipment;

a first mounting arm coupled to the axle beam between the two ends and extending outwardly from the axle beam;

a first mounting bracket pivotably coupled to the first mounting arm at a first horizontal pivot axis; and a first suspension member coupled to at least one of the axle beam and the first mounting arm, wherein the first suspension member is configured to support a load of the farm equipment, wherein the first mounting arm includes a first side plate and a second side plate laterally spaced from the first side plate, and wherein the first mounting bracket is located between the first side plate and the second side plate of the first mounting arm.

* * * * *